(12) United States Patent
Bangalore et al.

(10) Patent No.: US 8,831,944 B2
(45) Date of Patent: Sep. 9, 2014

(54) SYSTEM AND METHOD FOR TIGHTLY COUPLING AUTOMATIC SPEECH RECOGNITION AND SEARCH

(75) Inventors: Srinivas Bangalore, Morristown, NJ (US); Taniya Mishra, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 925 days.

(21) Appl. No.: 12/638,649

(22) Filed: Dec. 15, 2009

(65) Prior Publication Data

US 2011/0144995 A1   Jun. 16, 2011

(51) Int. Cl.
*G10L 15/14* (2006.01)
*G10L 15/08* (2006.01)
*G06F 17/30* (2006.01)

(52) U.S. Cl.
CPC ........ *G10L 15/083* (2013.01); *G06F 17/30637* (2013.01)
USPC ....................................................... 704/251

(58) Field of Classification Search
CPC ........................................................ G10L 15/14
USPC ....................................................... 704/251
See application file for complete search history.

(56) References Cited

U.S. PATENT DOCUMENTS

| | | | | |
|---|---|---|---|---|
| 7,379,870 | B1 * | 5/2008 | Belvin et al. | 704/255 |
| 7,571,098 | B1 * | 8/2009 | Gorin et al. | 704/257 |
| 7,957,971 | B2 * | 6/2011 | Gorin et al. | 704/257 |
| 8,234,115 | B2 * | 7/2012 | Mohri et al. | 704/256 |

OTHER PUBLICATIONS

Srinivas Bangalore et al., "Tightly Coupling Speech Recognition and Search", published in NAACL Conference Jun. 2009, 4 pages.

* cited by examiner

*Primary Examiner* — Susan McFadden

(57) ABSTRACT

Disclosed herein are systems, methods, and computer-readable storage media for performing a search. A system configured to practice the method first receives from an automatic speech recognition (ASR) system a word lattice based on speech query and receives indexed documents from an information repository. The system composes, based on the word lattice and the indexed documents, at least one triple including a query word, selected indexed document, and weight. The system generates an N-best path through the word lattice based on the at least one triple and re-ranks ASR output based on the N-best path. The system aggregates each weight across the query words to generate N-best listings and returns search results to the speech query based on the re-ranked ASR output and the N-best listings. The lattice can be a confusion network, the arc density of which can be adjusted for a desired performance level.

20 Claims, 6 Drawing Sheets

SYSTEM AND METHOD FOR TIGHTLY COUPLING AUTOMATIC SPEECH RECOGNITION AND SEARCH

BACKGROUND

1. Technical Field

The present disclosure relates to automatic speech recognition and more specifically to tightly coupling speech recognition and search components in the context of a speech-driven search application.

2. Introduction

With the exponential growth in the use of mobile devices in recent years, the need for speech-driven search interfaces is rapidly becoming apparent. The limited screen space and small or soft keyboards of mobile devices make it cumbersome to type text input of more than a few characters. Furthermore, by the mobile nature of these devices, users often use them in hands-busy environments, ruling out the possibility of typing text. The mobile environments of such devices are often noisy, making speech input much more troublesome than more quiet environments.

Speech search applications typically use automatic speech recognition (ASR) for transforming the user's speech input to text and a search component that uses the resulting text as a query to retrieve relevant documents from an information repository. Most of the literature on speech-driven search applications that are available in the consumer market emphasize the importance of the robustness of the ASR language model and the data needed to build such a robust language model, but search and recognition accuracy in speech searches continue as problems in this field.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

In contrast to the prior art approaches which treat speech-driven search to be largely an ASR problem followed by a Search problem, the approach disclosed herein provides benefits from tightly coupling ASR and search tasks in the context of a speech-driven search application and illustrates techniques to improve the accuracy of both components by exploiting the co-constraints between the two components. In one aspect, this disclosure is directed to the problem of speech-driven search to access information repositories using mobile devices. Examples throughout this disclosure use business listings containing the name, address and phone number of businesses as the information repository. Incorporating constraints from the information repository that is being searched not only improves speech recognition accuracy but also results in higher search accuracy.

This disclosure describes a speech-driven search application. In one illustrative example, a user of this application provides a speech utterance to a mobile device intending to search for the address and phone number of a business. Such a speech utterance typically contains a business name, optionally followed by a city and state to indicate the location of the business (e.g. "pizza hut near Urbana, Ill."). The application can support other input variations, such as user input of a business category (e.g. "Laundromats in Madison") and user input without location information (e.g. "hospitals"). The application uses the ASR results to search a large business listing database to retrieve entries that are pertinent to the user query.

The application recognizes these utterances using an ASR module that incorporates an acoustic model adapted to speech collected from mobile devices and a trigram language model that is built from millions of text query logs obtained from a companion web-based text-driven version of the speech search application. The application retrieves the relevant business listing entries based on 1-best speech recognition output in one variation.

Figure 4:
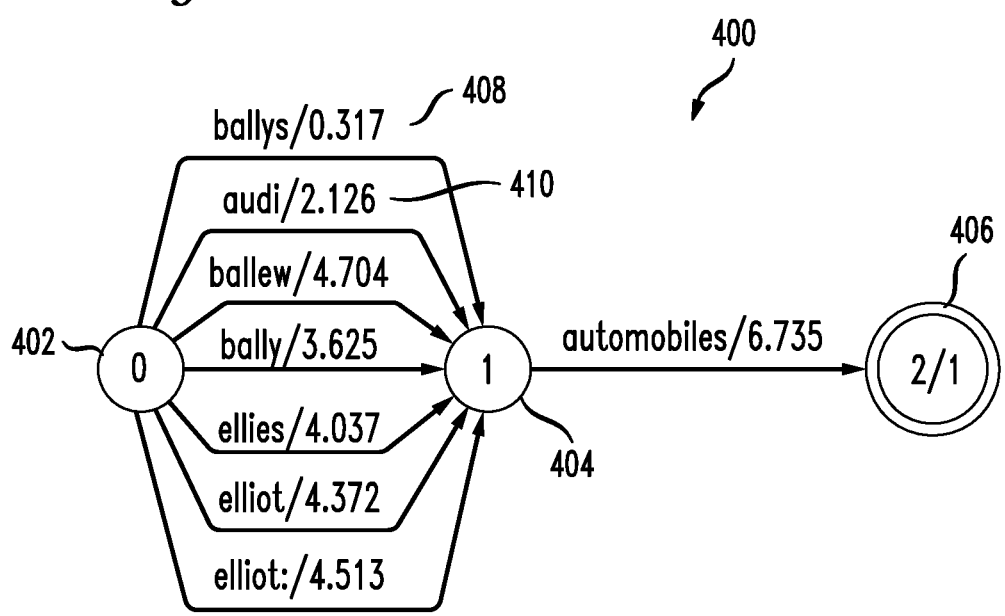
FIG. 4 illustrates an example word confusion network (WCN)

Given that ASR 1-best output has a high likelihood of being erroneous, this serialization of the ASR and search components often results in sub-optimal search accuracy. The oracle word/phrase accuracy using n-best hypotheses is far greater than the 1-best output. However, using each of the n-best hypothesis as a query to the search component is computationally sub-optimal since the strings in the n-best hypotheses usually share large subsequences with each other. A lattice representation of the ASR output, in particular, a word-confusion network (WCN) transformation of the lattice compactly encodes the n-best hypothesis with the flexibility of pruning alternatives at each word position. FIG. 4 illustrates an example WCN 400 with three nodes 402, 404, 406 and multiple arcs 408, 410 with various weights based on the speech recognition between nodes 402 and 404.

In order to obtain a measure of the ambiguity per word position in the WCN, the average arc density of a WCN is defined as the ratio of the total number of arcs to the number of states in the WCN. As can be seen, with very small increase in arc density, the number of paths that are encoded in the WCN can be increased exponentially. Improvements in oracle-path word and phrase accuracies are a function of the arc density. Oracle-path is a path in the WCN that has the least edit-distance to the reference string. In some cases, oracle accuracies can be improved by almost 10% absolute over the 1-best accuracy with small increase in the arc density.

Figure 5:
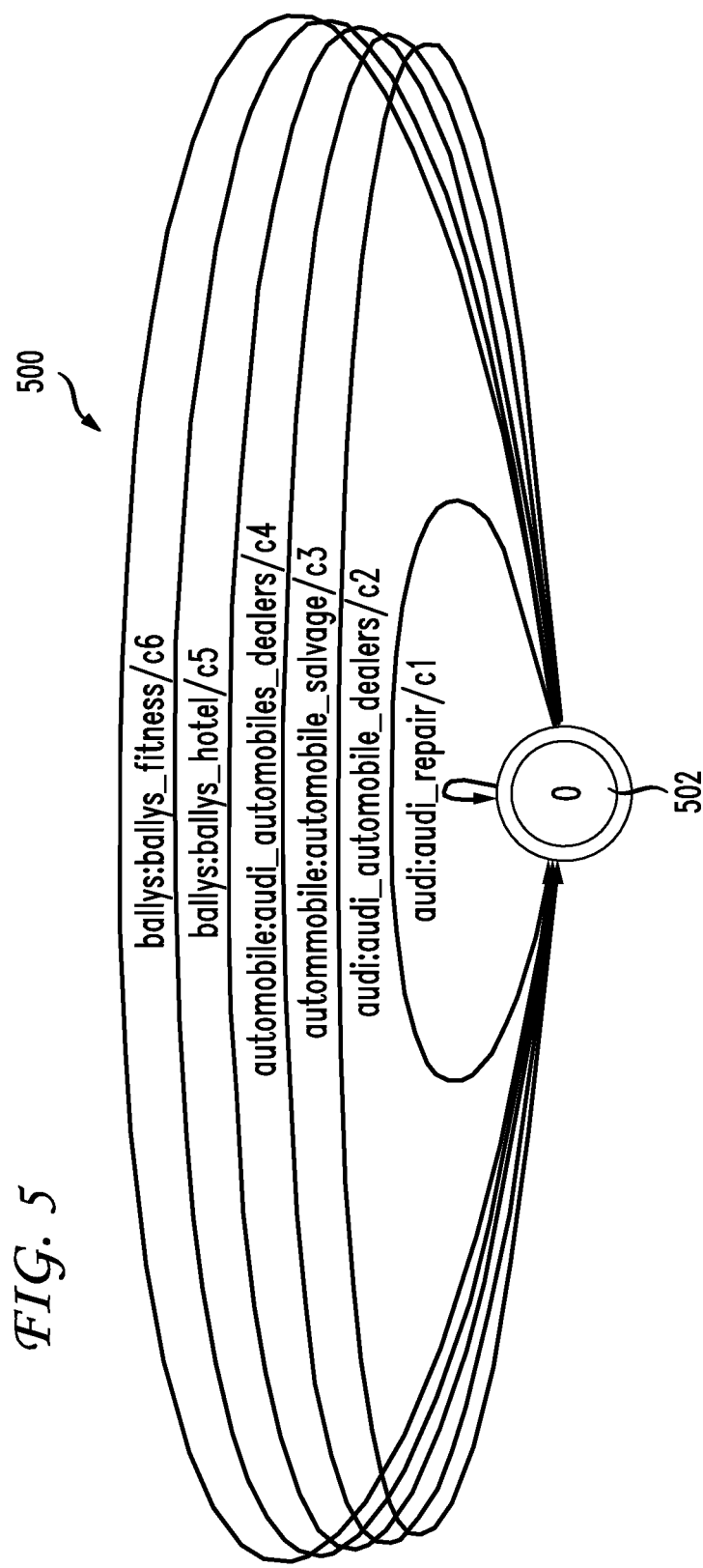
FIG. 5 illustrates an example of a finite state transducer (FST) representing a search index.

In order to exploit the WCNs for search, the system can use a custom-implemented search engine or an off-the-shelf search engine. The search engine indexes each business listing (d) in the data to search using the words ($w_d$) in that listing. The pair ($w_d$, d) is assigned a weight ($c_{(w_d,d)}$) using different metrics, including the standard tf*idf, as explained below. This search index is represented as an example weighted finite-state transducer (SearchFST) 500 as shown in FIG. 5, where $w_d$ is the input symbol, d is the output symbol and ($c_{(w_d,d)}$) is the weight of that arc. As shown, each arc begins and ends in a first node 502.

The system can use multiple different weighting metrics to determine the relevance of a document for a given query word that we have experimented with in this paper. Six example weighting metrics are provided herein. The first weighting metric is $idf_w$, which refers to the inverse document frequency of the word, w, which is computed as $\ln(D/d_w)$, where D refers to the total number of documents in the collection, and $d_w$ refers to the total number of documents in the collection that contain the word w. The second weighting metric is $atf_w$, which refers to the average term frequency, as computed by $cf_w/d_w$. The third weighting metric is $cf_w \times idf_w$. In this metric, $cf_w$ refers to collection frequency, which is simply the total number of occurrences of the word w in the collection. The fourth weighting metric is $atf_w \times idf_w$. The terms of this metric are described above. The fifth weighting metric is $$\sum \frac{f_{w,d}}{|d_w|} \times idf_w.$$

In this metric, $f_{w,d}$ refers to the frequency of the word w in the document d whereas $|d_w|$ is the length of the document d in which the word w occurs. The sixth exemplary weighting metric is $$\frac{cf_w}{\sum |d_w|} \times idf_w.$$

The terms of this metric are each described above. Other relevance metrics can encode more sophisticated constraints such as the relative coherence of the terms within a search query.

The system 100 composes a query (Qfst) (either a 1-best string represented as finite-state acceptor or a WCN) with the SearchFST to obtain all the arcs $(w_q, dw_q, c_{(w_d, d)})$ pairs where $w_q$ is a query word, $dw_q$ is a listing with the query word and, $c_{(w_d, d)})$ is the weight associated with that pair. Using this information, the system aggregates the weight for a listing ($d_q$) across all query words and ranks the retrieved listings in the descending order of this aggregated weight. The system selects the top N listings from this ranked list. The system computes the query composition, listing weight aggregation and selection of top N listings with finite-state transducer operations. The system can perform ASR and search simultaneously in the same step as shown in the {FSM Compose} 306 of FIG. 3 or sequentially.

Figure 6:
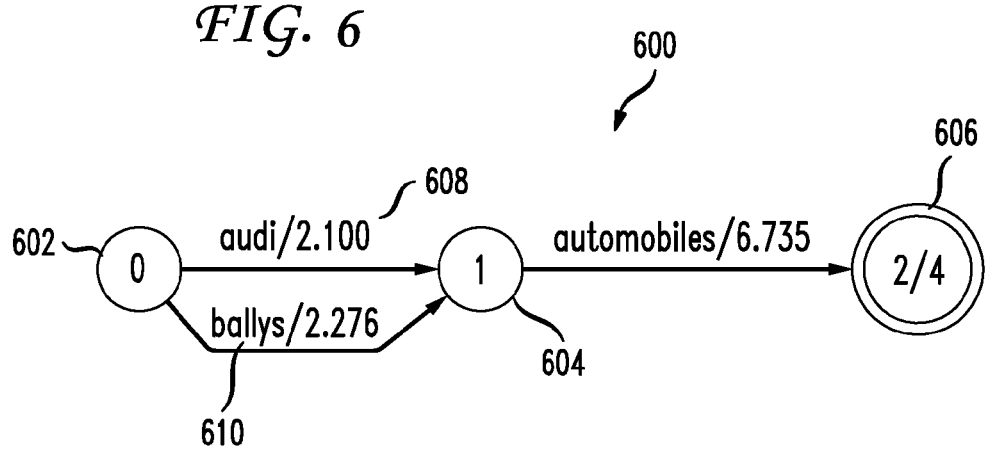
FIG. 6 illustrates an example rescored WCN using word level search relevance weights.

FIG. 6 illustrates an example rescored WCN as a result of reranking the WCN shown in FIG. 4 using the search relevance weights of each word in the WCN. After transforming the scores into costs and searching for minimum cost paths, the least cost path for the WCN in FIG. 4 is "ballys automobiles" while the reranked 1-best output in FIG. 6 is "audi automobiles."

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
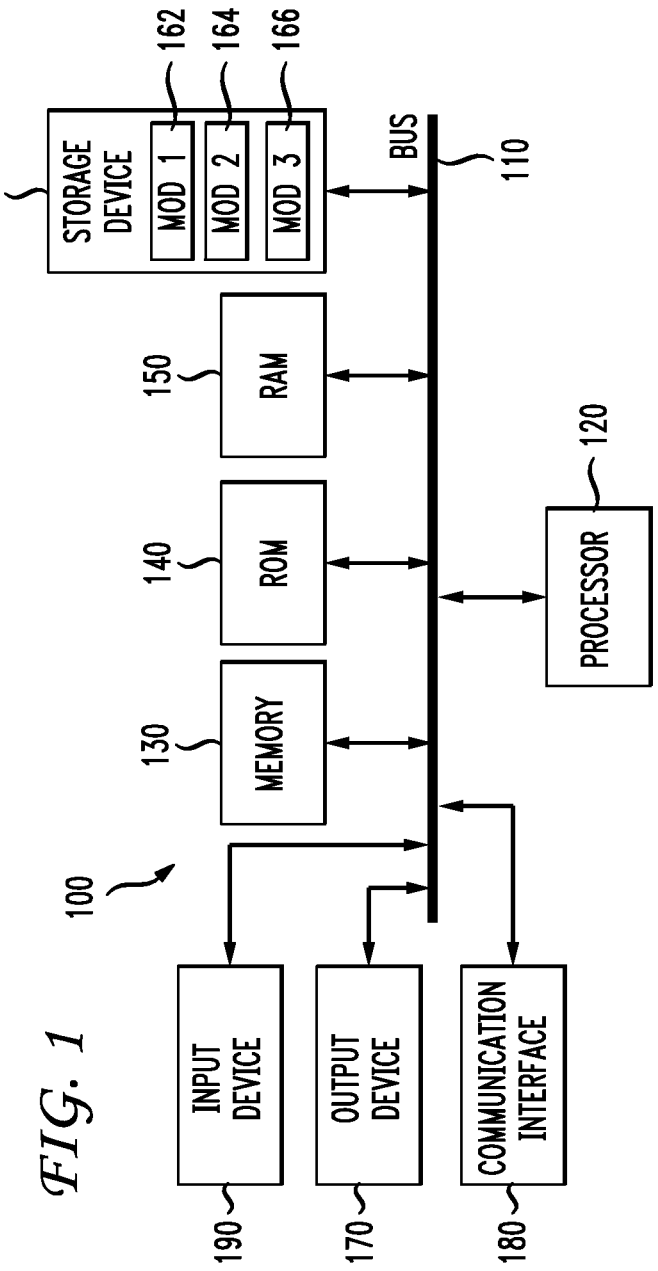
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
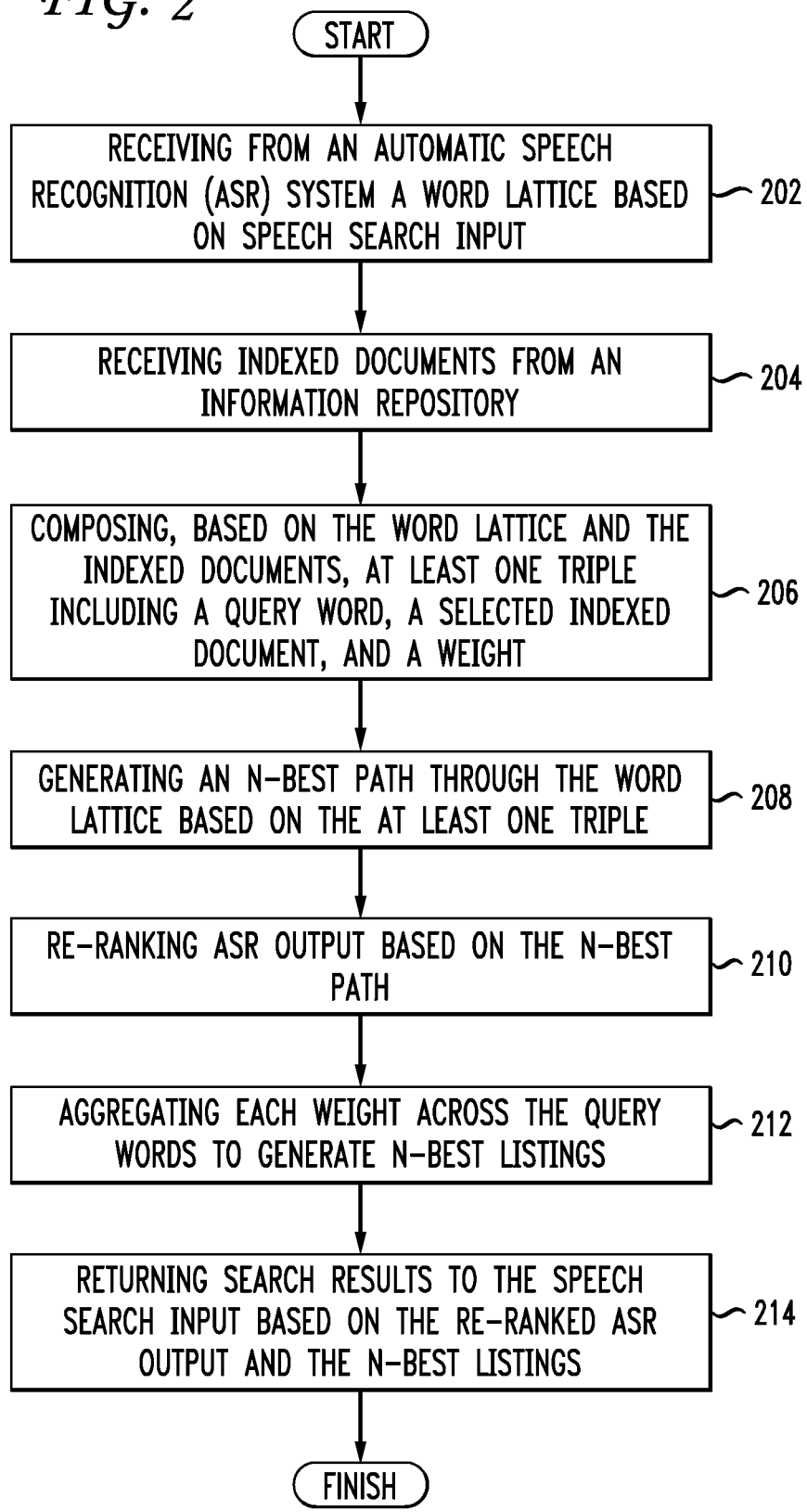
FIG. 2 illustrates an example method embodiment.

Having disclosed some basic system components, the disclosure now turns to the exemplary method embodiment for performing searches as shown in FIG. 2. For the sake of clarity, the method is discussed in terms of an exemplary system such as is shown in FIG. 1 configured to practice the method.

The system 100 receives from an automatic speech recognition (ASR) system a word lattice based on speech search input (202), such as a spoken query. The spoken query can be directed to a navigation application, general information search, a video search, a local media library search, a customer service application, a teaching scenario, a game, an automated help or manual application, and so forth. Typically the search FST is associated with the query. In one aspect, multiple search FSTs exist to address different aspects of a query or to handle entirely unrelated classes of queries. A mobile device, computer terminal, telephone, or other suitable communications device (such as a mail server receiving an email audio attachment) can receive the speech search input from the user. The word lattice can be a word confusion network (WCN). The system can adjust the arc density of the WCN to achieve a desired performance or speech recognition accuracy level.

The system 100 receives indexed documents from an information repository (204) which can be represented as a search finite-state machine. The search finite-state machine can represent an index of the indexed documents. The system 100 composes, based on the word lattice and the indexed documents, at least one triple including a query word, a selected indexed document, and a weight (206). The system 100 and/or another mechanism can determine the weights based on a plurality of relevance metrics. In one aspect, the weights already exist and the system 100 merely modifies the existing weights.

The system 100 generates an N-best path through the word lattice based on the at least one triple (208) and re-ranks ASR output based on the N-best path (210). In one aspect, the system re-ranks ASR output based on constraints which are encoded as relevance metrics. The system 100 can re-rank the ASR in descending order, for example. The system 100 aggregates each weight across the query words in parallel or sequentially to generate N-best listings (212) and returns search results to the speech search input based on the re-ranked ASR output and the N-best listings (214).

Figure 3:
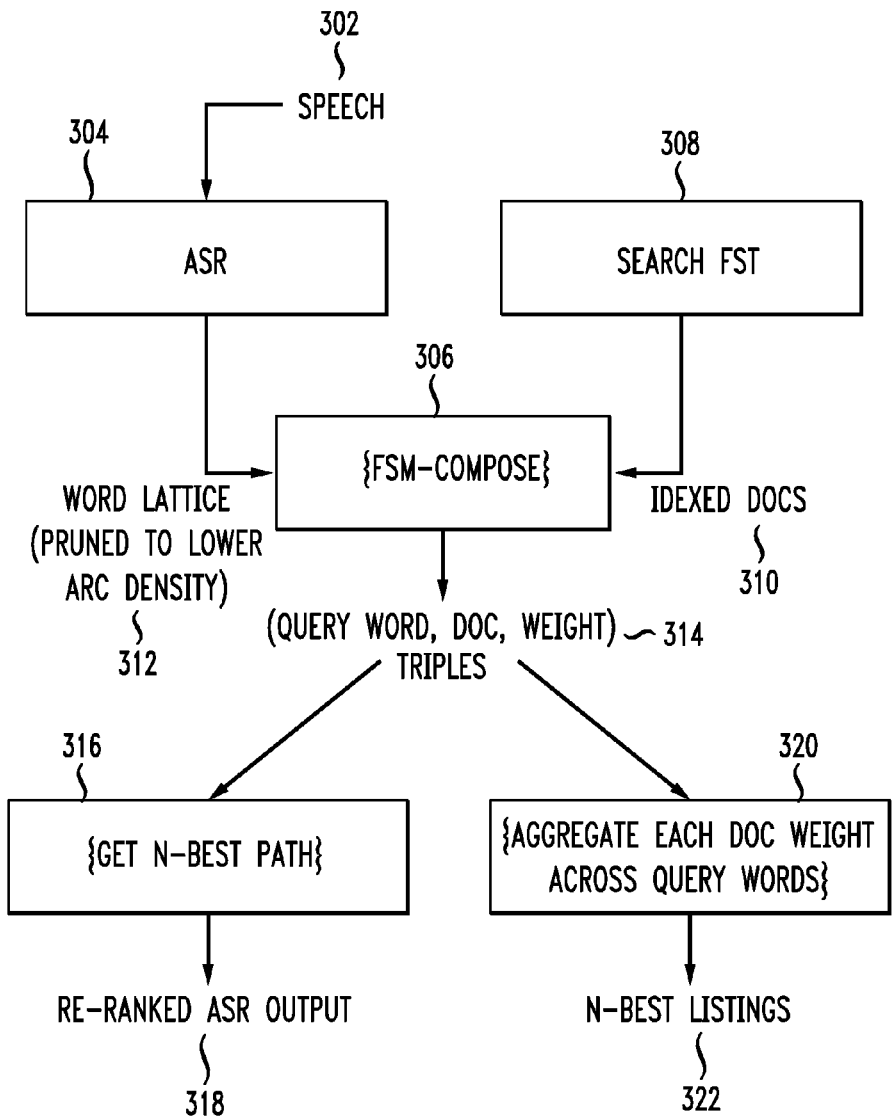
FIG. 3 illustrates an exemplary block diagram of a system flow for performing searches.

FIG. 3 illustrates an exemplary block diagram of a system flow 300 for performing searches. A user enters a speech query 302. An ASR unit 304 receives and recognizes the speech query 302. The ASR unit 304 outputs a word lattice 312 to a finite state machine (FSM) composer 306. The system can prune the word lattice 312 to lower the arc density. The FSM composer 306 also receives from a search finite state transducer 308 a set of indexed documents 310. From these two inputs, the FSM composer 306 generates triples 314 of a query word, a document, and a weight. The FSM composer uses the word lattice and the indexed documents to mutually restrict the results of the ASR and the search results such that both benefit from enhanced accuracy and/or speed. The FSM composer 306 passes the triples 314 to a module that gets the n-best paths 316 and re-ranks the ASR output 318. The FSM composer 306 also passes the triples 314 to a module that aggregates each document weight across the query words 320 to generate the N-best listings 322. The system generates search results in response to the speech query based on the re-ranked ASR output 318 and the N-best listings 322.

One core idea behind the principles disclosed herein for tightly coupling ASR and search is to rerank the ASR output using the constraints (encoded as relevance metrics) from the search task. In one experimental dataset, $$\sum \frac{f_{w,d}}{|d_w|} \times idf_w$$

was the relevance metric that best improved accuracy. When the system used this metric to rerank the ASR output of a test set, the ASR accuracy improved from 65.1% to 65.9% at the word level and from 55.3% to 56.2% at the phrase level. This reranking also improved the F-Score of the search results from 0.718 to 0.735. These results demonstrate that tightly coupling ASR and search can improve the accuracy of both components.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can also apply to other search domains using human input other than speech which may be modeled as a lattice, such as gestures. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving, from an automatic speech recognition system, a word lattice based on a speech query;
   receiving indexed documents from an information repository;
   composing, based on the word lattice and the indexed documents, a triple comprising a query word, a selected indexed document, and a weight;
   generating an N-best path through the word lattice based on the triple;
   re-ranking automatic speech recognition output based on the N-best path, to yield a re-ranked automatic speech recognition output;
   aggregating each weight across the query words to generate N-best listings; and
   returning search results to the speech query based on the re-ranked automatic speech recognition output and the N-best listings.

2. The method of claim 1, wherein the word lattice is a word confusion network.

3. The method of claim 2, further comprising adjusting an arc density of the word confusion network based on a desired performance level.

4. The method of claim 2, further comprising adjusting an arc density of the word confusion network based on a desired accuracy level.

5. The method of claim 1, wherein automatic speech recognition and searching is performed simultaneously.

6. The method of claim 1, wherein the weight is determined based on a plurality of relevance metrics.

7. The method of claim 1, wherein a mobile device receives the speech query.

8. The method of claim 1, wherein re-ranking the automatic speech recognition output is further based on constraints encoded by relevance metrics and the information repository.

9. The method of claim 1, wherein the indexed documents are represented as a search finite state machine.

10. The method of claim 9, wherein the search finite state machine represents an index of the indexed documents.

11. A system comprising:
    a processor; and
    a computer-readable storage medium having instructions stored which, when executed by the processor, cause the processor to perform operations comprising:
        receiving, from an automatic speech recognition system, a word lattice based on a speech query;
        receiving indexed documents from an information repository;
        composing, based on the word lattice and the indexed documents, a triple comprising a query word, a selected indexed document, and a weight;
        generating an N-best path through the word lattice based on the triple;
        re-ranking automatic speech recognition output based on the N-best path, to yield a re-ranked automatic speech recognition output;
        aggregating each weight across the query words to generate N-best listings; and
        returning search results to the speech query based on the re-ranked automatic speech recognition output and the N-best listings.

12. The system of claim 11, wherein the indexed documents are represented as a search finite state machine.

13. The system of claim 11, wherein the weight is determined based on a plurality of relevance metrics.

14. The system of claim 11, wherein a mobile device receives the speech query.

15. The system of claim 11, wherein re-ranking automatic speech recognition output is further based on constraints encoded as relevance metrics.

16. A computer-readable storage device having instructions stored which, when executed by a computing device, cause the computing device to perform operations comprising:
    receiving from an automatic speech recognition system a word lattice based on speech query;

receiving indexed documents from an information repository;

composing, based on the word lattice and the indexed documents, a triple comprising a query word, a selected indexed document, and a weight;

generating an N-best path through the word lattice based on the triple;

re-ranking automatic speech recognition output based on the N-best path, to yield a re-ranked automatic speech recognition output;

aggregating each weight across the query words to generate N-best listings; and returning search results to the speech query based on the re-ranked automatic speech recognition output and the N-best listings.

17. The computer-readable storage device of claim 16, wherein the word lattice is a word confusion network.

18. The computer-readable storage device of claim 17, the computer-readable storage device having additional instructions stored which result in the operations further comprising adjusting an arc density of the word confusion network based on a desired performance level.

19. The computer-readable storage device of claim 17, the computer-readable storage device having additional instructions stored which result in the operations further comprising adjusting an arc density of the word confusion network based on a desired accuracy level.

20. The computer-readable storage device of claim 16, wherein re-ranking ranked automatic speech recognition output is further based on constraints encoded as relevance metrics.

* * * * *